United States Patent [19]

Kojima

[11] Patent Number: 4,860,171

[45] Date of Patent: Aug. 22, 1989

[54] SURFACE ILLUMINATING APPARATUS

[75] Inventor: Takeshi Kojima, Tondabayashi, Japan

[73] Assignee: T. Chatani & Co., Ltd., Osaka, Japan

[21] Appl. No.: 259,730

[22] Filed: Oct. 19, 1988

[30] Foreign Application Priority Data

Oct. 20, 1987 [JP] Japan ................... 62-264717

[51] Int. Cl.$^4$ ............................................. F21V 7/04
[52] U.S. Cl. ...................................... 362/31; 362/327;
362/331; 362/812; 362/311; 40/546
[58] Field of Search ................ 362/31, 311, 327, 330,
362/331, 812; 40/546

[56] References Cited

U.S. PATENT DOCUMENTS

| 2,347,665 | 5/1944 | Christensen et al. | 362/31 |
|---|---|---|---|
| 2,646,637 | 7/1953 | Nierenberg et al. | 362/31 |
| 3,242,328 | 3/1966 | Kapany et al. | 362/31 |
| 4,642,736 | 2/1987 | Masuzawa et al. | 362/31 |

FOREIGN PATENT DOCUMENTS

| 5838186 | 12/1983 | Japan | 362/31 |
|---|---|---|---|
| 674238 | 6/1952 | United Kingdom | 362/31 |

Primary Examiner—Ira S. Lazarus
Assistant Examiner—Richard R. Cole
Attorney, Agent, or Firm—Stevens, Davis, Miller & Mosher

[57] ABSTRACT

A surface illuminating apparatus in which a plurality of transparent plates of different spot patterns formed of a large number of fine spots painted or printed at one side are layered in the relation that spotted surfaces having the painted or printed spots are not opposite to each other, thereby forming a surface illuminating body, a reflecting plate is brought into close contact with the spotted surface of the rearmost transparent plate, in turn, the rear surface of the body, a light diffusion plate in close contact with a non-spotted surface of the foremost transparent plate, in turn, the surface of the body, and light sources for irradiating light on the body are disposed at both lateral end sides of the body.

5 Claims, 1 Drawing Sheet

SURFACE ILLUMINATING APPARATUS

FIELD OF THE INVENTION

The present invention relates to a surface illuminating apparatus, and more particularly to a surface illuminating apparatus used as back light for a liquid crystal display, a sign display, a display unit or the like.

BACKGROUND OF THE INVENTION

Conventionally, this kind of surface illuminating apparatus, as disclosed in, for example, the Japanese Utility Model Publication Gazette No. Sho 58-38,186, is provided at one surface of a transparent plate with a large number of fine spots, a reflecting plate is mounted on the transparent plate so as to cover the spotted surface, a light diffusion plate is brought into close contact with the other surface of the transparent plate, and a light source is disposed at the lateral end surface thereof, thereby uniformly illuminating the entire surface of the light diffusion plate.

The above-mentioned conventional example, however, includes one transparent plate which is provided at one surface thereof with the predetermined spots, so that the light incident on the transparent plate is repeatedly refracted and reflected by the spots and reflecting plate and then emitted through the light diffusion plate in a diffusing manner, the light reflected by the spots and emitted from the light diffusion plate is brighter than that which is not reflected by the spots but is repeatedly refracted and emitted from the light diffusion plate, thereby causing the brightness to be uneven.

In order to eliminate the fact that the brightness is uneven, the spots may be increased in number, but it is then difficult for the light emitted from the light source to travel to a distance, thereby causing the brightness to be uneven due to a distance from the light source. Hence, the problem is created in that the entire surface of the light diffusion plate is not yet uniformly brightened.

SUMMARY OF THE INVENTION

In order to solve the above problem, the present invention has been designed.

An object of the invention is to provide a surface illuminating apparatus simple in construction to obtain on the entire surface of light diffusion plate a high uniformity ratio of illuminance of light emitted from the light diffusion plate.

The present invention is characterized in that a plurality of transparent plates each are provided at one surface with a spotted surface having a plurality of fine spots painted or printed in a different pattern, the transparent plates being layered not to be opposite to each other so as to form a surface illuminating apparatus body, a reflecting plate is brought into close contact with the spotted surface of the rearmost transparent plate, that is, the rear surface of the body, a light diffusion plate is brought into close contact with the non-spotted surface of the foremost transparent plate, that is, the surface of the body, and a light source to irradiate light on the body is provided at the lateral end side of the body.

The light from the light source incident on the surface illuminating body travels straight in each transparent plate and through a space at the boundary between each spotted surface and each non-spotted surface, and through the boundary between the spotted surface of the rearmost transparent plate and the reflecting plate. The light incident on the space at each boundary is reflected by the spots at the spotted surface, repeatedly refracted and reflected by the reflecting plate, and then transmits the light diffusion plate, thereby illuminating the entire surface thereof. The surface illuminating body has transparent plates each having a different spot pattern and the spotted surfaces are apart from each other by a thickness of each transparent plate, whereby the light incident thereon and on the space at the boundary travels independently. The light reflected by the spots at the transparent plates other than the foremost transparent plate is refracted so as to be less hindered by the spots at other transparent plates from traveling, thereby uniformly illuminating the entire surface of the light diffusion plate.

The spots on the spotted surface of each transparent plate are reduced in number so as to enable the light to travel to a distance from the light source, and also a plurality of transparent plates are layered, so that the total number of the spots directly reflecting the light emitted from the source is larger than the number of spots when only one transparent plate is used, resulting in that the light diffusion plate is brightened as a whole and the incident light travels to a distance to thereby uniformly illuminate the same. Moreover, although the light diffusion plate itself is somewhat uneven in brightness, the surface illuminating body is uniformly illuminated.

Accordingly, the light diffusion plate is uniformly brightened to remakably increase the evenness of illuminance.

The above and further objects and novel features of the invention will more fully appear from the following detailed description when the same is read in connection with the accompanying drawings.

DETAILED DESCRIPTION OF THE INVENTION

Figure 1:
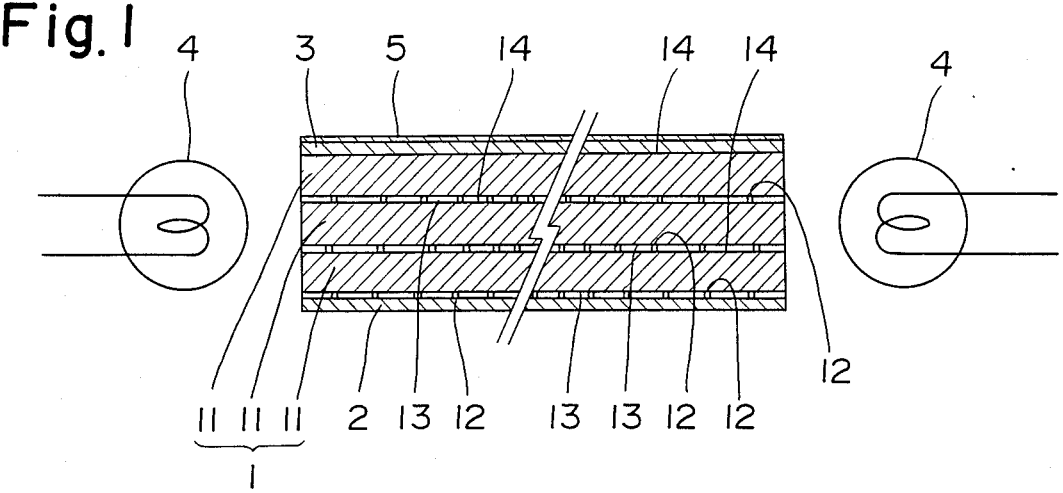
FIG. 1 is a partially omitted enlarged sectional view of an embodiment of a surface illuminating apparatus of the invention.
Figure 2:
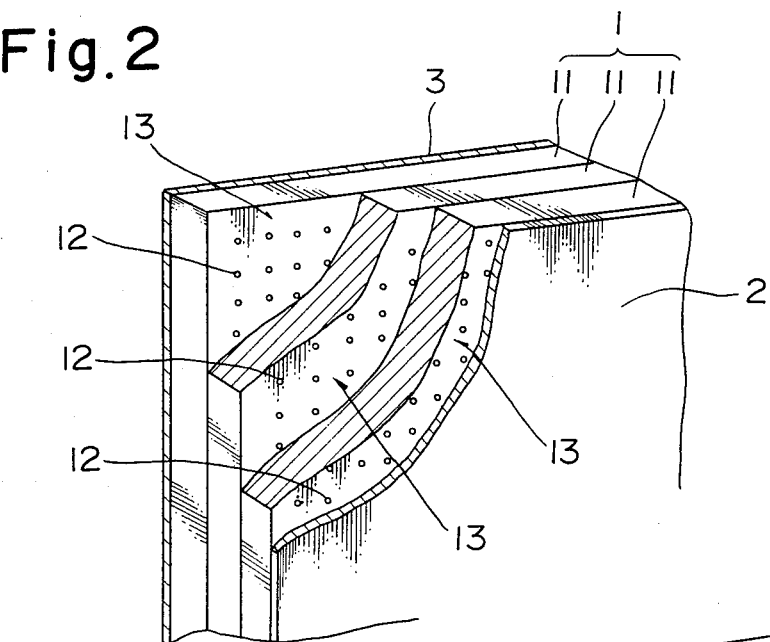
FIG. 2 is a partially cutaway perspective rear view thereof.

Referring to FIGS. 1 and 2, an embodiment of a surface illuminating apparatus of the invention includes three transparent plates 11 and is applied to, for example, a liquid crystal display.

Each transparent plate 11 is composed mainly of an acrylic resin plate of 2 to 4 mm in thickness, which is made smooth at both surfaces so as not to reflect light irregularly, on one of both the surfaces, which is printed by a screen process printing or the like, is a large number of fine spots 12 of about 30 $\mu$m in height formed of a white mat paint mixed with fine glass beads (not shown), thereby forming a spotted surface 13 of a particular pattern. In this case, each spot 12 is preferred to be formed hemispherical, but may be formed in different configuration. The spot pattern is preferred to dispose the spots to be thin close to and dense far from a light source 4 so as to enable the light to travel to a distance.

The spot pattern at each transparent plate 11 may dispose the spots at random, but is preferable to dispose them regularly in order to accurately control brightness.

In order to change the spot pattern at each transparent plate 11 when the spots 12 are disposed regularly in the predetermined pitch, the transparent plates, when viewed in plan, are layered in the relation that the spots are skew to (i.e. offset from) each other, or different in pitch from each other.

Anyway, most, preferably all, of spots are skew when viewed in plan and the spot pattern at each transparent plate is different, so that it is preferable for improving the uniformity ratio of illuminance to produce at each transparent plate the so-called moire interference pattern.

The transparent plates 11 having different spot 12 arrangements from each other are layered so that the spotted surfaces 13 are not opposite to each other, thereby forming the surface illuminating body 1.

In the surface illuminating body 1 constructed as above-mentioned, the spotted surface 13 of the rearmost transparent plate 11 is positioned at the rear surface of the body 1 when in use and a non-spotted surface 14 of the foremost transparent plate 11 is positioned at the surface of the same when in use.

A reflecting plate 2 formed of a polyester film or the like not to absorb light is brought into close-contact with the entire spotted surface 13 of the rearmost transparent plate 11 at the rear surface of the body 1 in a manner of coating the spotted surface 13. A light diffusion plate 3 of milk-white color and of polyester or the like so as to diffuse the light is brought into close contact with the entire non-spotted surface 14 smooth and not printed with the spots 12, so that the light incident on the surface illuminating body 1 is adapted to illuminate the light diffusion plate 13. Also, at both lateral side surfaces of the surface illuminating body 1 are disposed light sources 4 comprising incandescent lamps, fluorescent lamps, cold cathode lamps or hot-cathode lamps, so that the light from each light source is incident on the surface illuminating body 1. The surface of the light diffusion plate 3 is disposed a colored transparent or an opaque display member 5 for displaying characters, pictures or drawings by using the aforesaid surface illuminating apparatus as backlighting.

The light from each light source 4, when incident on the surface illuminating body 1, travels in each transparent plate 11 and partially in a space at the boundary between the spotted surface 13 and the non-spotted surface 14 opposite thereto and that at the boundary between the outermost spotted surface 13 and the reflecting plate 2. Then, the light is directly reflected by the spots at the transparent plate 11 and partially repeats refraction and reflection by the surface illuminating body 1 and reflecting plate 2, thereby uniformly illuminating the entire surface of the light diffusion plate 3. Hence, the display member 5 can clearly be identified at the entire surface thereof. In this case, the surface illuminating body 1 is composed of the plurality of transparent plates 11 and the spot patterns at the transparent plates 11 are different from each other, whereby the light incident on each transparent plate 11 and each boundary independently travels, and the light reflected by the spotted surface 13 may be refracted and is less hindered from its traveling by the spots 12 at the spotted surface 13 of the transparent plate 11 positioned at the front side of the body 1, thereby enabling the entire surface of light diffusion plate 3 to be uniformly illuminated. Also, the light can travel to a distance from each light source 4 because the spots 12 are disposed to be thin close to the light source 4 and dense far therefrom, whereby even when the surface illuminating body 1 is enlarged, the light diffusion plate 3 can uniformly be illuminated.

Incidentally, when a surface illuminating body 1 composed of three transparent plates 11 in layers and of 2 mm in thickness and different in the spot pattern from each other and that composed of two transparent plates in layers and of 3 mm in thickness are impinged by the light from the light source 4, brightness at the light diffusion plate 3 of the former can be more intense by about 20% than the latter and its uniformity ratio of illuminance can be improved. Hence, as seen from such comparison, it will be understood that the surface illuminating apparatus of the invention is remarkably improved of its uniformity ratio of illuminance more than the conventional example.

Incidentally, when the aforesaid conventional example and the embodiment of the surface illuminating apparatus of transparent plates in three layers of the invention are made equal in thickness and irradiated by the same light source for a one-lamp system of employing one lamp disposed at one side of the surface illuminating body, the brightness of the surface illuminating apparatus of the invention increases about 1.7- to 2.5-fold, and for a two-lamp system of disposing two lamps at both sides of the body, the same increases about 2.5- to 3.0-fold.

In the conventional example, when the number of light sources increases or the light source is enlarged in the size, the brightness on the light diffusion plate can increase, but the problem is created in that an unevenness of illuminance occurs. However, the surface illuminating apparatus of the invention can increase the brightness on the light diffusion plate by increasing the number of light sources or enlarging the size thereof, and also eliminate the unevenness of illuminance.

In brief, since a plurality of transparent platés 11 provided with the spots 12 are layered, the total number of the spots 12 can increase without increasing them per transparent plate and the light from each light source 4 can independently travel through the transparent plates 11 and spaces at the aforesaid boundaries.

Accordingly, the uniformity ratio of illuminance and the brightness can remarkably be increased in comparison with the use of one transparent plate 11.

Figure 3:
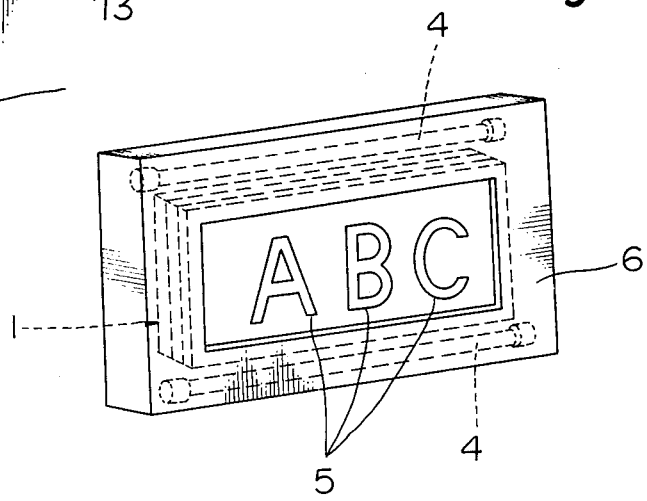
FIG. 3 is a view exemplary of a display unit using the surface illuminating apparatus of the invention.

Next, explanation will be given on the use of the surface illuminating apparatus of the invention as an electrical decorative sign. Referring to FIG. 3, the surface illuminating apparatus of the invention is housed in a casing 6 having a window 7 through which the light diffusion plate 3 is exposed at the surface of the apparatus and the display member 5, such as a liquid crystal plate or a film, for displaying characters, pictures or drawings disposed at the surface of light diffusion plate 3 is disposed.

In this case, the total thickness of the apparatus is reducible by about 1/5 in comparison with the case where a lamp is housed at the rear of the electrical decorative sign to directly illuminate the sign and also the light source is reducible in number, thereby saving its installation space and reducing the number of light sources when equal brightness is required. As the result, a running cost as well as an initial cost lower and the display member is illuminated clearly uniformly throughout the light diffusion plate without creating an unevenness of brightness.

Alternatively, the light sources 4 may be disposed at the four sides of the body 1 or at one side only. In brief, the light is adapted to be incident on the body 1 from the lateral end thereof.

Also, a plurality of transparent plates different in thickness may of course be used in combination.

As seen from the above, the surface illuminating apparatus of the present invention includes a plurality of transparent plates 11 having a large number of spots painted or printed in different pattern in relation of not-opposing to each other to thereby form the apparatus body 1, brings the reflecting plate 2 into close contact with the spotted surface of the rearmost transparent plate 11 and the light diffusion plate 3 with the non-spotted surface of the foremost transparent plate 11, and the light sources 4 are disposed at both the lateral sides of the body 1, thereby illuminating the entire surface of the light diffusion plate clearly and uniformly in comparison with the use of only one transparent plate. Hence, the light diffusion plate, in turn, the surface to be illuminated, increases in area to expand an applicable range to that extent.

While an embodiment of the invention has been shown and described, the invention is not limited to the specific construction thereof, which is merely exemplary in the specification rather than is defined.

What is claimed is:

1. A surface illuminating apparatus comprising:
   (a) a surface illuminating body comprising a plurality of transparent plates in layers, each of said transparent plates being provided at one side with a spotted surface provided with a large number of fine spots, said spotted surface of each of said transparent plates being different in a spot pattern from each other, said transparent plates being layered in the relation that said spotted surfaces thereof are not opposite to each other, said spotted surface of said transparent plate at the rearmost layer being positioned at the rear surface of said surface illuminating body, and a non-spotted surface of said transparent plate at the foremost layer being positioned at the surface of said surface illuminating body,
   (b) a reflecting plate layered in close contact with said spotted surface of said transparent plate at the outermost layer, in turn, the rear surface of said surface illuminating body,
   (c) a light diffusion plate layered in close contact with said non-spotted surface of said transparent plate at the outermost layer, in turn, the surface of said surface illuminating body, and
   (d) light sources disposed at both the lateral sides of said surface illuminating body so as to irradiate light in said surface illuminating body.

2. A surface illuminating apparatus according to claim 1, wherein said spot patterns at said transparent plates when layered are disposed in relation of making said spots offset from each other when viewed in plan.

3. A surface illuminating apparatus according to claim 1, wherein said spot pattern of each of said transparent plates is a pattern of disposing said spots regularly at predetermined pitch, so that, when said transparent plates are layered, said spots at each of said transparent plates are shifted from each other in a offset manner when viewed in plan.

4. A surface illuminating apparatus according to claim 1, wherein each of said plates has a said spot pattern of regularly disposed spots having a pitch different from that of another one of said plates.

5. A surface illuminating apparatus according to claim 1, wherein spot density of said spot pattern at each of said transparent plates is thin at a side close to each of said light sources and thick at a side far therefrom.

* * * * *